United States Patent
Gruaz (10) Patent No.: US 7,582,850 B2
(45) Date of Patent: Sep. 1, 2009

(54) HOUSEHOLD ELECTRICAL APPLIANCE COMPRISING TWO HEATING SUB-ASSEMBLIES ARTICULATED ON EACH OTHER

(75) Inventor: Denis Gruaz, Villaz (FR)

(73) Assignee: SEB SA, Ecully (FR)

( * ) Notice: Subject to any disclaimer, the term of this patent is extended or adjusted under 35 U.S.C. 154(b) by 181 days.

(21) Appl. No.: 10/558,470

(22) PCT Filed: May 25, 2004

(86) PCT No.: PCT/FR2004/001288

§ 371 (c)(1),
(2), (4) Date: Nov. 1, 2006

(87) PCT Pub. No.: WO2004/107941

PCT Pub. Date: Dec. 16, 2004

(65) Prior Publication Data

US 2007/0095817 A1   May 3, 2007

(30) Foreign Application Priority Data

May 28, 2003 (FR) .................................. 03 06520
Jun. 6, 2003 (FR) .................................. 03 06896

(51) Int. Cl.
*H05B 3/02* (2006.01)
*H05B 3/06* (2006.01)

(52) U.S. Cl. ....................................... 219/486; 219/524

(58) Field of Classification Search ......... 219/482–486, 219/524, 525, 541; 99/389–399; 337/377
See application file for complete search history.

(56) References Cited

U.S. PATENT DOCUMENTS 3,245,337 A * 4/1966 White et al. .................. 99/331
3,852,569 A * 12/1974 Potvin ......................... 219/525
4,476,379 A * 10/1984 Andrizzi ...................... 219/524
6,024,014 A   2/2000 Kasai
6,064,042 A   5/2000 Glucksman et al.

(Continued)

FOREIGN PATENT DOCUMENTS

CH   669 243 A   2/1989

(Continued)

OTHER PUBLICATIONS

International Search Report.

*Primary Examiner*—Sang Y Paik
(74) *Attorney, Agent, or Firm*—Robert F. Zielinski (57) ABSTRACT

The subject is a household electrical appliance (1) comprising two articulated heating sub-assemblies (2, 3) and resistances (7) connected to an electricity supply component (8). The component (8) can be separated from the resistances and includes contactors (9). It is moreover adapted to engage with a hinge (4) by which the two heating sub-assemblies (2, 3) are articulated, the hinge, which includes at least one mobile part (16), being configured in a way either to implement the articulation of the sub-assemblies, under the effect of acting upon said mobile part (16) to bring it towards an articulation position through the electricity supply component (8, 11) then engaging its connection with the corresponding electric resistance (7), or to allow the relative separation of the sub-assemblies by releasing the mobile part (16) which is no longer acted upon by the electricity supply component (8, 11), when it is disconnected.

21 Claims, 3 Drawing Sheets

U.S. PATENT DOCUMENTS

| | | | |
|---|---|---|---|
| 6,555,795 B2 * | 4/2003 | Glucksman et al. ...... 219/450.1 | |
| 2002/0153366 A1 | 10/2002 | Glucksman et al. | |

FOREIGN PATENT DOCUMENTS

| | | |
|---|---|---|
| DE | 11 84 393 B | 12/1964 |
| DE | 28 21 331 A1 | 11/1979 |
| DE | 199 35 983 A1 | 2/2001 |
| EP | 0 646 344 A | 4/1995 |
| EP | 0 696 430 A | 2/1996 |
| FR | 2 516 352 A | 5/1983 |
| FR | 2 687 133 A | 8/1993 |
| GB | 891 603 A | 3/1962 |
| GB | 972 813 A | 10/1964 |

* cited by examiner

HOUSEHOLD ELECTRICAL APPLIANCE COMPRISING TWO HEATING SUB-ASSEMBLIES ARTICULATED ON EACH OTHER

CROSS REFERENCE TO RELATED PATENT APPLICATIONS

The present application is a U.S. National Stage filing of Patent Cooperation Treaty ("PCT") application serial number PCT/FR2004/001288, filed May 25, 2004, which in turn claims priority to France Patent Application Serial Number 0306520, filed May 28, 2003 and France Patent Application Serial Number 0306896, filed Jun. 6, 2003, all of which are hereby incorporated by reference herein in their entireties. PCT/FR2004/001288 was published in French under PCT Article 21(2) as WO/2004/107941 on Dec. 16, 2004.

FIELD OF THE INVENTION

The present invention relates to a household electrical appliance comprising two heating subassemblies articulated on each other, for example a waffle iron, a meat griddle, a sandwich toaster.

BACKGROUND OF THE INVENTION

There are known household electrical appliances of this type which are articulated on each other between a closed position and an open position and electric resistances connected each to a sub-assembly, and, together, to an electricity supply component adapted to supply power to the electric resistances of the two heating sub-assemblies whether they are in the open position or in the closed position.

An appliance of this kind is for example described in Swiss patent application CH 680 185. In this document, to allow the appliance to be cleaned, in respect of each heating sub-assembly, the cooking plate can be separated from the shell forming the body of the sub-assembly, and the resistance which is anchored to a power supply component specific to the corresponding heating subassembly, can itself be separated from the shell given that the power supply component can be separated from the heating sub-assembly. Separating each heating sub-assembly into three parts (shell, cooking plate and electric resistance integral with its corresponding power supply component) makes the sub-assembly easier to clean.

However, in order to prevent any extraction of the electric resistances from the corresponding sub-assembly while they are at a certain preset temperature, the appliance includes a safety device which includes, on the one hand, elements which are integral with the electric resistance, and, on the other hand, elements which are integral with the cooking plate. Thus, the proper operation of this device is dependent upon the exact positioning of the electric resistance relative to the cooking plate, in other words on the exact positioning both of the electric resistance and of the cooking plate relative to the corresponding shell.

The problem posed is to implement an appliance of the aforementioned type that is able to be cleaned very easily, and in respect of which the safety device relative to turning on the appliance is not dependent on a shift (which in itself presents no risk) in the positioning of the constituent elements of each heating sub-assembly (cooking plate, electric resistance and shell).

DISCLOSURE OF THE INVENTION

The solution proposed by the present invention is an appliance of the aforementioned type in respect of which the power supply component (or block) can be separated from the resistances and includes contactors adapted to establish in a separable way the electrical connection with the resistances of the two heating sub-assemblies.

Thus, the electricity supply component which includes all the electrical components intended to power and control the power supply of the electric resistances of the two heating sub-assemblies, is not anchored to the resistances. The power supply component and the electric resistances engage together like a plug and a plug receptacle. When the power supply component is separated from the two heating sub-assemblies, the unit formed by these two heating sub-assemblies does not comprise any electrical components and it is therefore able to be cleaned with a large amount of water, particularly by using a dishwasher. Moreover, since the electric resistances are not integral with the power supply component, the separation of the power supply component from the heating sub-assemblies does not involve extracting the resistances from the heating subassemblies, and therefore, it is not necessary to have a particular safety device in order to allow the electric resistances to be extracted.

Other advantages and particularities of the present invention will emerge from the description of the embodiment which is shown in the appended figures and which is given by way of example and non-restrictively.

DETAILED DESCRIPTION OF THE DRAWINGS

Figure 1:
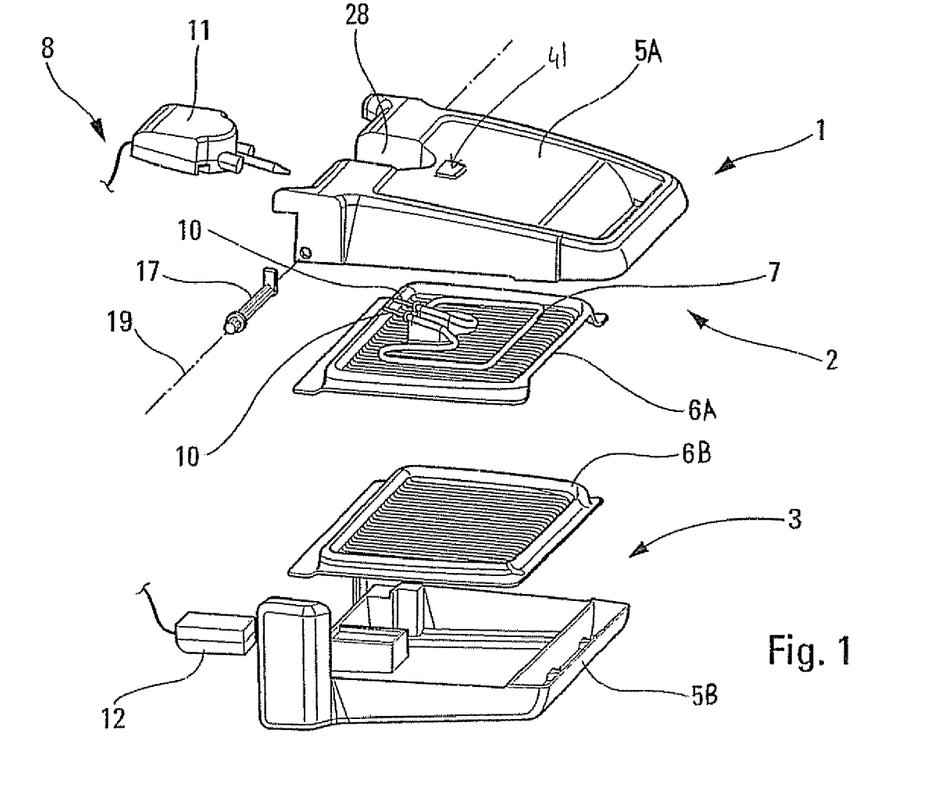
FIG. 1 is an exploded perspective view of a household electrical appliance complying with the present invention.

A household electrical appliance 1 (in the event a meat griddle) comprises two heating sub-assemblies 2, 3 which are articulated on each other via a hinge 4 between a closed position and an open position.

Each heating sub-assembly 2, 3 includes a shell 5A, 5B which forms the body of the corresponding heating subassembly 2, 3, a cooking plate 6A, 6B which is supported by the corresponding shell 5A, 5B and which is adapted to receive the food to be cooked, and an electric resistance 7 which is adapted to supply the cooking heat to the corresponding cooking plate 6A, 6B.

Furthermore, the household electrical appliance 1 includes an electricity supply component 8 which includes all the electrical components of the appliance (regulating, connecting and indicating devices, thermostatic control knob, indicator light, etc.) contributing to the controlled electricity supply of the resistances. Since it is able to be separated from the two heating sub-assemblies 2, 3, the component 8 does not inhibit the articulation of these two heating subassemblies, when it is connected. Thus, th e household electrical appliance 1 is able to adopt a number of positions: the closed position in which it is able to griddle the food which is caught between the two cooking plates 6A, 6B, a so-called "oven" position in which the two cooking plates 6A, 6B are in a position similar to that in the closed position, (with however a gap between them of about 50 mm in order to define a cooking volume), the open position in which the two cooking plates 6A, 6B form an angle of between 60° and 100° approximately, and a so-called "barbecue" position in which the two cooking plates 6A, 6B are aligned flat and form an angle of 180 °.

In compliance with the present invention, the electricity supply component 8 can be separated from the electric resistances 7 and includes contactors 9 adapted to establish the electrical connection with the resistances, and more exactly with the connection terminals 10 located at the ends of the electric resistances 7.

Thus, when the electricity supply component 8 is separated from the heating sub-assemblies 2, 3, the unit formed by these two sub-assemblies does not contain any electric or electronic element and is therefore able to be thoroughly washed, for example in the dishwasher.

The electrical connection is particularly straightforward, since the connection component 8 plugs into the two heating sub-assemblies 2, 3 in the manner of an electric plug.

In the present embodiment, for each heating subassembly 2, 3, the electric resistance 7 is anchored to the corresponding cooking plate 6A, 6B. Moreover, for each heating sub-assembly 2, 3, the cooking plate 6A, 6B is anchored to the corresponding shell 5A, 5B. Therefore, each heating sub-assembly 2, 3 forms a single part which the user is not able to dismantle. The fixture of the cooking plate 6A, 6B to the corresponding shell 5A, 5B is not watertight and, washing and rinsing water may seep inside. To allow the water to drain properly, the parts constituting the heating sub-assemblies 2, 3 do not comprise a water retention area. Obviously, the connection terminals 10 are watertight.

Figures 3, 4:
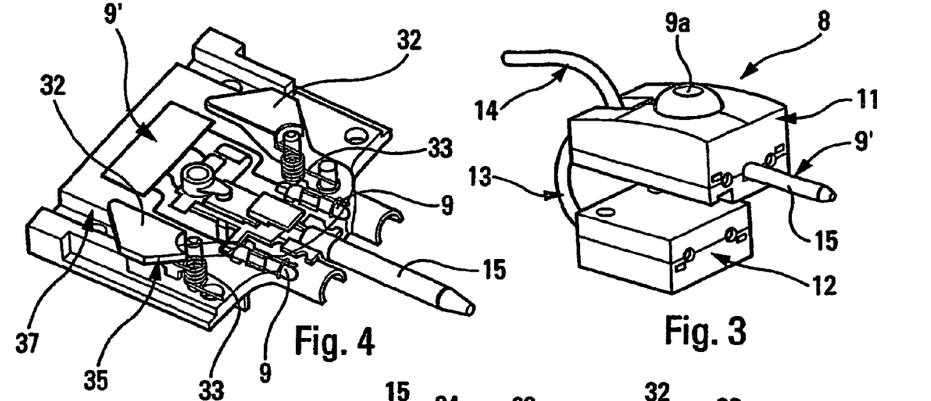
FIG. 3 is a perspective view, from underneath, of an electrical connection component complying with the present invention.
FIG. 4 is a perspective view, from underneath, of a connection component case, without its protective cover.
Figure 5:
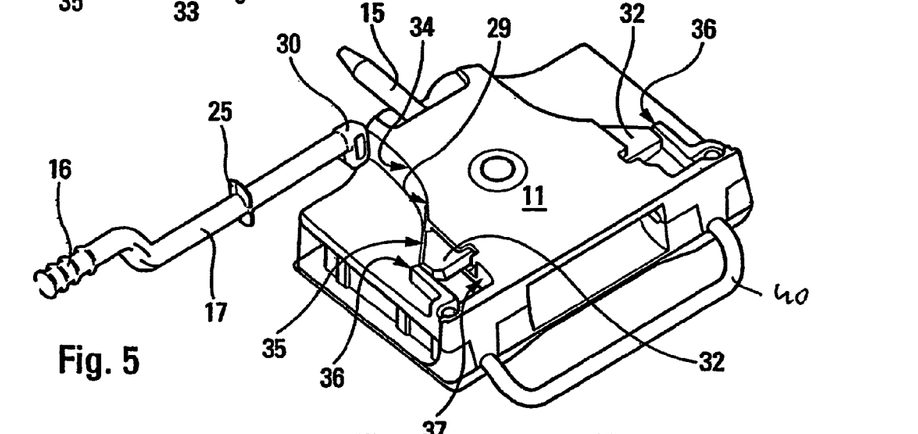
FIG. 5 is a simplified perspective view showing the engagement, in the release position, between a hinge rod and the main case in accordance with a particular embodiment.

As can be seen from FIG. 3, in the present embodiment, the electricity supply component 8 includes a main connection case 11 which is adapted to establish the electrical connection with the electric resistance 7 of a first heating sub-assembly 2, and a secondary connection case 12 which is adapted to establish the electrical connection with the electric resistance 7 of the other heating sub-assembly 3. The two cases 11, 12 are connected up like an electric plug and are related flexibly to each other (in the present example this relative "articulation" is constituted by a connecting cable 13 which ensures electrical continuity). This connecting cable 13 providing the articulation between the two cases 11, 12 is totally independent of the hinge 4 which provides the articulation of the two heating subassemblies 2, 3.

Thus, to facilitate implementation in this instance, the connection component 8 includes a main case 11, a secondary case 12, a power supply cable 14 which can be plugged into the mains and which runs into the main case 11 and the connecting cable 13.

In the present example the secondary case 12 includes only the contactors 9 by means of which it supplies power to the electric resistance 7 of the heating sub-assembly 3. The component 8 (preferably the main case 11) comprises,—apart from the contactors 9 by which it supplies power to the electric resistance 7 of the first heating sub-assembly 2, all the electric and electronic devices 9' for control, regulation, and display (display 9a), and particularly a temperature probe 15 which projects outside the main case 11 and which comes into contact with the cooking plate 6A, 6B of the first heating sub-assembly 2 when the main case 11 is connected to the first heating sub-assembly 2. This concentration of the electrical devices (apart from the resistances) onto a removable component facilitates the use of the appliance and is a guarantee of safety.

The main case 11 includes a gripping component 40 (in the event a handle) allowing it to be displaced manually and easily from one to the other of its positions.

Additionally, to ensure that the main case 11 can be relied on to stay in its position when connected with the electric resistance 7 and thereby to avoid any unwanted movement, it is preferable for the user to have to expend a certain effort to move it out of its position when connected. To facilitate such movement while retaining reliability in positioning, the first heating subassembly 2 includes a manual control component 41 which is mobile between a rest position and an ejection position. This component 41 is adapted to engage with the main case 11 so as to drive the case 11 out of its connected position when it moves from its rest position to its ejection position.

Figures 7, 8, 9, 10:
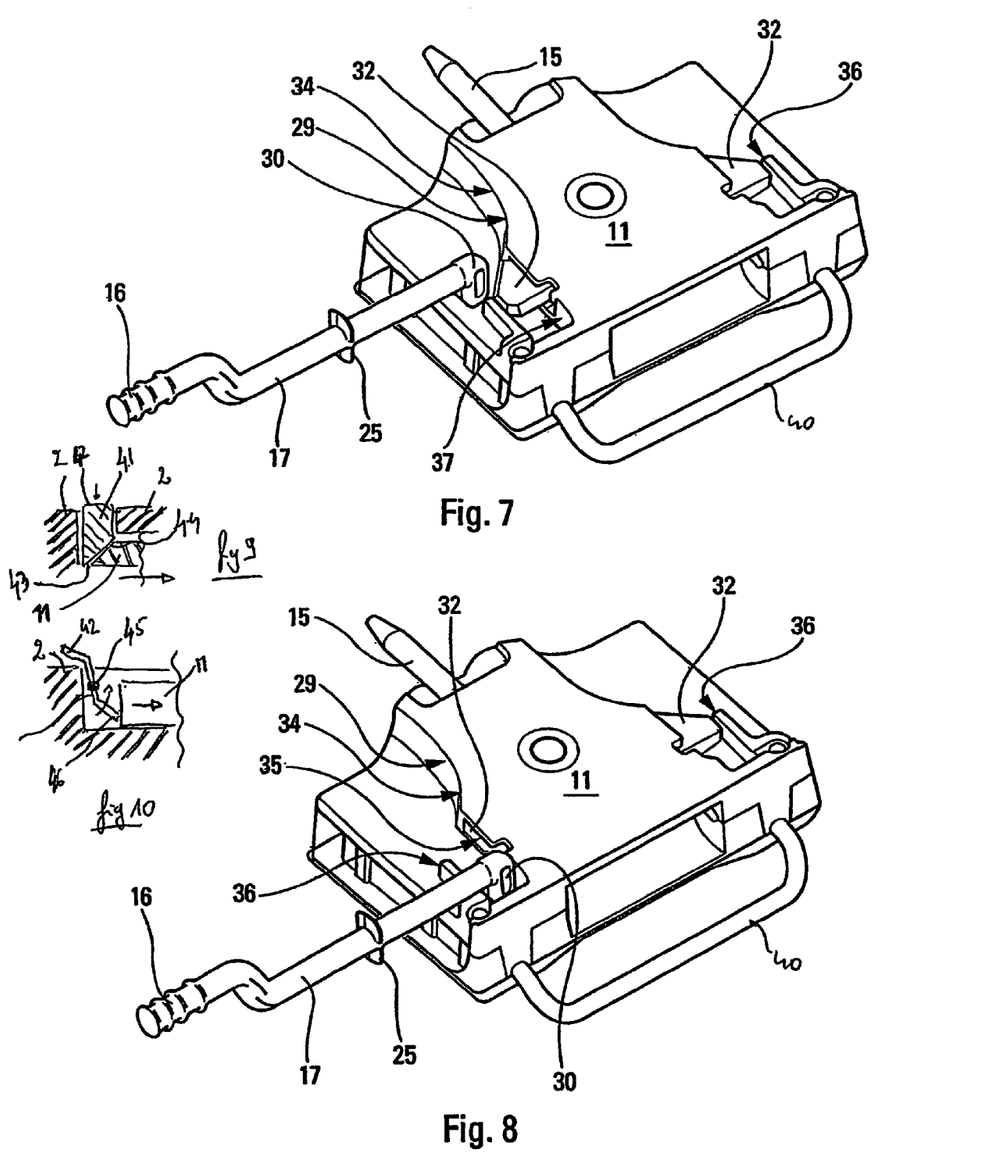
FIG. 7 is a view similar to FIGS. 5 and 6, the main case being in the stop position.
FIG. 8 is a view similar to FIGS. 5 to 7, the main case being in the connection position.
FIG. 9 is a diagrammatic cross-section view showing the engagement between the main case of the connection component and a first type of manual control component.
FIG. 10 is a view similar to FIG. 9, the manual control component being of a second type.

As can be seen in FIG. 9, in a first embodiment, the manual control component 41 is a button 41 which is mounted to slide in the first heating sub-assembly 2. This button 41 includes a manual control surface 42 accessible to the user, and an inclined surface 43 which is adapted to slide against a complementary inclined surface 44 carried by the main case 11 in order to displace the latter.

As can be seen in FIG. 10, in a second embodiment, the manual control component 41 is a lever 41 which is mounted to pivot relative to the first heating subassembly 2 around a fulcrum pin 45. This lever 41 includes, apart from the manual control surface 42, a cam surface 46 which is adapted to come to a stop against the main case 11 and to displace it when the lever 41 pivots.

The secondary case 12 also includes a gripping component 50 (in the event an easily accessible surface) allowing it to be displaced manually and easily from one to the other of its positions.

Additionally, in the present embodiment, the main case 11 is adapted to engage with the hinge 4 such that, on the one hand, when it is separated from the first heating sub-assembly 2, the hinge 4 is configured so as to allow the separation of the two heating sub-assemblies 2, 3, and, on the other hand, when it is connected to the corresponding electric resistance 7, the hinge 4 is configured so as to be able to implement the articulation between the two heating sub-assemblies 2, 3.

Thus, when the connection component 8 is separated from the two heating sub-assemblies 2, 3, the latter separate from each other, which has the advantage of making them easier to clean (being easier to handle and taking up a smaller amount of space—particularly in the dishwasher).

Figure 2:
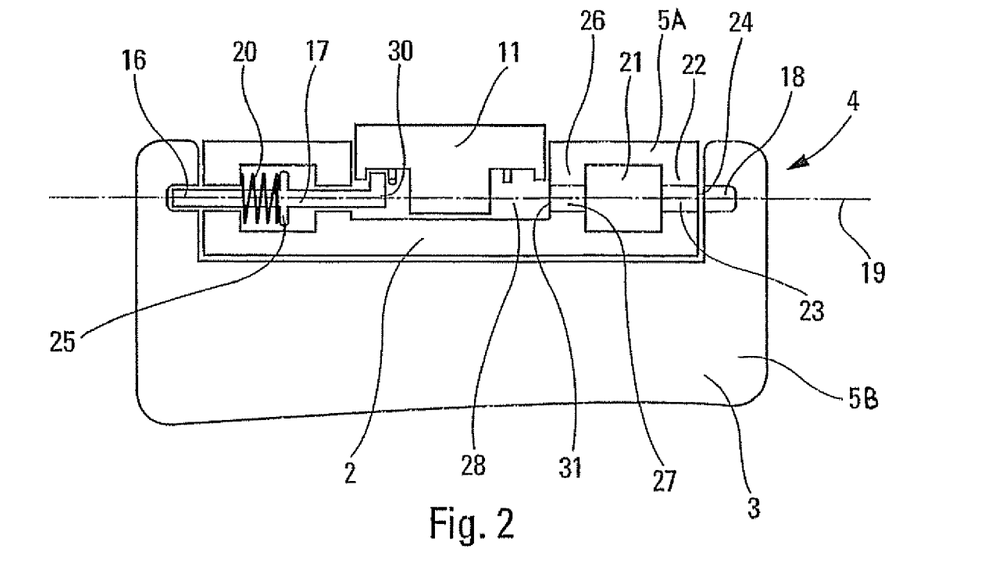
FIG. 2 is a simplified cross-section view of the household electrical appliance along the axis of the hinge.

To this end, the first heating sub-assembly 2 comprises, on each lateral side, an articulation element 16 carried by a rod 17, and vice versa, the second heating sub-assembly comprises, on each side, a housing 18 (for a fuller understanding, in FIG. 2, the illustration shows a rod 17 from one side only, the other side being left blank). The articulation element 16 is formed by a first end of the rod 17 and is adapted to penetrate into the corresponding housing 16 in order to implement the hinge 4.

The articulation element, and therefore in this instance each rod 17, is mobile between a retracted position releasing the sub-assemblies and an engaged position of relative articulation of the latter. When the rod 17 is in the retracted position, the articulation element 16 cannot penetrate into the corresponding housing 18, and therefore, the two heating sub-assemblies 2, 3 are able to be separated. When the rod 17 is in the articulation position, the articulation element 16 is in the corresponding housing 18 (provided that the two heating sub-assemblies 2, 3 have previously been arranged correctly one relative to the other), the hinge 4 being implemented, the two heating sub-assemblies 2, 3 being connected one to the other so as to pivot around the axis 19 of the hinge 4 (FIG. 2).

In the present example, each rod 17 is acted upon by a return component (spring) 20 to bring it towards its retracted position. Each rod 17 is mounted to slide relative to the first heating sub-assembly 2 along the direction of the axis 19 of the hinge 4.

On each lateral side, the first heating sub-assembly 2 comprises a housing 21 passed through by the corresponding rod 17. Each housing 21 is delimited on one side by an outer wall 22 which is perpendicular to the axis 19, which is adjacent to the corresponding housing 18 of the second heating sub-assembly 3 when the two heating sub-assemblies 2, 3 are correctly arranged one relative to the other, and which is passed through by an outer channel 23 emerging through an orifice 24, opposite the corresponding housing 18.

This articulation element 16 is mounted to slide in the corresponding outer channel 23. It projects outside the corresponding orifice 24 when the rod 17 is in its articulation position, and is housed in the outer channel 23 when the rod 17 is in its retracted position.

For each rod 17, the retracted position is defined by a lug 25 integral with the rod 17 and coming to a stop against an internal wall 26 which delimits the corresponding housing 21, which faces the corresponding outer wall 22, and which is passed through by an inner channel 27 in which the rod 17 is adapted to slide.

The main case 11 is mounted to slide on the first heating sub-assembly 2 between a release position in which it is able to be separated from the first heating sub-assembly 2 and in which the articulation element 16 is in its retracted position, and a connection position which is the only position in which it supplies power to the corresponding electric resistance 7 and in which the articulation element 16 is in its articulation position.

The first heating sub-assembly 2 comprises a cavity 28 in which the main case 11 is adapted to slide along a direction of translatory motion perpendicular to the axis 19 of the hinge 4.

The main case 11 includes a guide surface 29 configured so as to drive, during the displacement of the main case 11 between its release and connection positions, a drive element 30 which is integral with the articulation element 16 and which, in the present example, is constituted by the second end of the corresponding rod 17. The guide surface 29 thus acts as a cam surface.

Each inner channel 27 runs, through an orifice 31, into the cavity 28, opposite the main case 11. Each drive element 30 is mounted to slide in the corresponding inner channel 27, and projects outside the corresponding orifice 31 whether the rod 17 is in its articulation position or in its retracted position.

Thus, in the present example when the two heating sub-assemblies 2, 3 are articulated, the main case 11 is in its connection position in the cavity 28, the two drive elements 30 are brought to a stop against the guide surfaces 29 through the action of the springs 20, the two guide surfaces 29 being configured so that, when the main case 11 is in the connection position, the rods 17 are in their articulation position.

When the user wishes to separate the two heating sub-assemblies 2, 3, the main case 11 is driven towards its release position (and towards its separation from the first heating sub-assembly 2), as the two springs 20 act upon the two drive elements 30 in the direction of the cavity 28, and given the form of the two guide surfaces 29, the consequence of the translatory motion of the main case 11 is that the two rods 17 slide from their articulation position to their retracted position.

When the user wishes to reconnect the two heating sub-assemblies 2, 3 he arranges them correctly one relative to the other, correctly adjusts the main case 11 relative to the cavity 28 and drives it into its connection position, the two guide surfaces 29 driving the two drive elements 30 towards the outside of the cavity 28 until the rods 17 are in the articulation position.

Furthermore, for safety reasons, the main case 11 engages with the hinge 4 so that it is mobile from its release position, as far as its connection position if the two heating sub-assemblies 2, 3 are correctly arranged one relative to the other, or as far as a stop position located between its release and connection positions if the two heating sub-assemblies 2, 3 are not correctly arranged one relative to the other.

Thus, the main case 11 is only able to supply power to the electric resistance 11 of the first heating subassembly 2 if the two heating sub-assemblies 2, 3 are articulated one on the other.

The amplitude of the movement of the main case 11 depends on the positioning of the two heating subassemblies 2, 3. Indeed, the main case 11 engages with the two rods 17 and is configured so as to be mobile from its release position, as far as its connection position, if the articulation elements 16 are arranged in their housing 18, or, as far as its stop position, if the articulation elements 16 are outside their housing 18.

Furthermore, the amplitude of the movement of each rod 17 also depends on the positioning of the two heating sub-assemblies 2, 3. Indeed, each rod 17 is mobile from its retracted position, as far as a contact position in which the articulation element 16 is stopped in the corresponding housing 18, if the two heating subassemblies 2, 3 are articulated one on the other, or, as far as a deployed position in which it projects outside the orifice 24, beyond its contact position, if the two heating sub-assemblies 2, 3 are separated one from the other.

Thus, each rod 17 is able to adopt the four following successive positions during its translatory motion: a retracted position, an articulation position, the contact position (which is one of the articulation positions), and a deployed position (only if the articulation element 16 is not in the housing 18).

The main case 11 is additionally mobile between its release position and a selection position located between its release and stop positions and it is adapted to drive the two rods 17 from their retracted position into their contact position when it moves from its release position to its selection position.

Thus, the main case 11 may adopt the four following successive positions during its translatory motion: a release position, a selection position, a stop position, and a connection position (only if the articulation element 16 is stopped in the housing 18).

The main case 11 includes, on each side, a selection component 32 which is mobile between a drive position and an activated position.

Each selection component 32 is adapted to engage with the corresponding rod 17 such that, on the one hand, when the articulation element 16 is in its contact position, outside the housing 18, it is in its drive position and it drives the rod 17 beyond its contact position when the main case 11 moves from its selection position to its stop position, and, on the other hand, when the articulation element 16 is in its contact position, in the housing 18, the rod 17 drives it from its drive position to its activated position when the main case 11 moves from its selection position to its contact position.

A spring 33 the force of which is greater than that of the spring 20 acting upon the corresponding rod 17, acts upon the corresponding selection component 32 to bring it towards its drive position.

When the user wishes to supply power to the electric resistance 7 of the first heating sub-assembly 2, he drives the main case 11 from its release position to its connection position.

Figure 6:
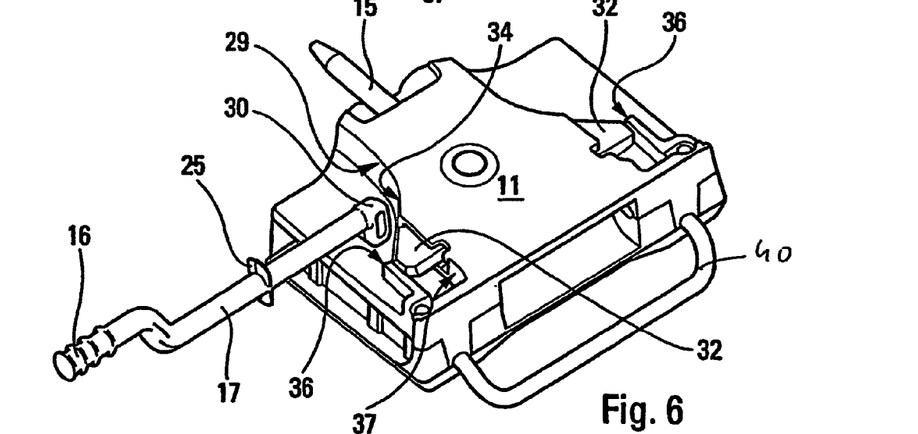
FIG. 6 is of view similar to FIG. 5, the main case being in the selection position.

Initially, the main case 11 moves from its release position to its selection position and thereby, it drives the two rods 17 from their articulation position into their contact position. In this particular configuration, each rod 17 engages with a corresponding selection component 32 which is in the drive position on account of the spring 33 (FIG. 6).

Secondly, if the two heating sub-assemblies 2, 3 are correctly arranged one relative to the other, each rod 17 is stopped in its housing 18 and, when the main case 11 is driven beyond its selection position, each rod 17 drives the corresponding selection component 32 from its drive position to its activated position. Given the configuration of the selection component 32, the main case 11 is able to be driven into its connection position (FIG. 8).

Secondly, if the two heating sub-assemblies 2, 3 are not correctly arranged one relative to the other, the rods 17 are not stopped in their housing 18 and, when the main case 11 is driven beyond its selection position, the selection components 32 remain in the drive position and drive the rods 17 into a deployed position (given the ratio of force of the two springs 20, 33). Given the configuration of the selection component 32, the main case 11 is locked in its movement before it can reach its connection position (FIG. 7).

In the present example, each guide surface 29 includes a drive surface 34 which is adapted to engage with the drive element 30 so as to drive the articulation element 16 from its retracted position to its contact position, a selection surface 35 which is carried by the selection component 32 and which extends the drive surface 34, a stop surface 36 which extends the selection surface 35 when the selection component 32 is in the drive position and which is configured so as to come to a stop against the drive element 30 when the main case 11 is in the stop position, and a connecting surface 37 which extends the selection surface 35 when the selection component 32 is the activated position, which extends beyond the stop surface 36 and which is configured so as to keep the articulation element 16 in the housing 18.

The drive element 30 is configured so as to be able to skirt round the stop surface 36 when it slides along the connecting surface 37.

Thus, when the rod 17 is in the articulation position, when the main case 11 is driven in the direction of its selection position, the drive element 30 comes into contact with the drive surface 34 which acts like a cam surface and drives the rod 17 into its contact position.

If the rod 17 is in the housing 18, the movement of the main case 11 and the layout of the selection component 32 mean that the drive element 30, supported against the selection surface 35, drives the selection component 32 into the activated position, slides along the selection surface 35 then along the connecting surface 37.

If the rod 17 is not in the housing 18, the movement of the main case 11 and the layout of the selection component 32 mean that the drive element 30 slides along the selection surface 35 of the selection component 32 in the drive position which acts like a cam surface, and comes to a stop against the stop surface 36 which prevents the main case 11 from reaching its connection position.

It is well understood that according to this particular embodiment, supplying power to the first heating sub-assembly 2 is only possible when the two heating sub-assemblies 2, 3 are articulated one on the other.

Furthermore, the secondary case 12 is connected electrically to the main case 11 so that it is supplied with power by the main case 11 only when the latter supplies power to the electric resistance 7 of the first heating sub-assembly 2. This is implemented straightforwardly by a judicious connection of the electric wires of the connecting cable 13 to the connectors 9 of the main case 11.

Quite clearly the invention is not restricted to the present embodiment and numerous modifications may be made to it.

The resistances would be able not to be anchored to the cooking plates, and in that case they may either be in contact with them (heat transmission by conduction), or at a distance (transmission by radiation).

It would also be possible for each heating subassembly to comprise a reflector arranged between the electric resistance and the shell in order to restrict the transmission of heat in the direction of the latter.

It would also be possible for the second heating sub-assembly to comprise a manual control component similar to the one carried by the first heating subassemblies so as to make electrical disconnection of the secondary case easier.

The invention claimed is:

1. A household electrical appliance (1) comprising:
two heating sub-assemblies (2, 3) which are articulated on each other, each heating sub-assembly including a shell (5), a cooking plate (6), and an electric resistance (7);
an electricity supply component (8) comprising electrical components that contribute to the control of an electricity supply to the electric resistances (7) and contactors (9) adapted to establish an electrical connection between the electric resistances (7) and the electrical components irrespective of the position the two heating sub-assemblies (2, 3) are in;
wherein the electricity supply component (8) can be separated from the two heating sub-assemblies (2, 3), in the manner of an electric plug; and
wherein the hinge (4) includes at least one housing (18) which is implemented in a first heating sub-assembly (3), and an articulation element (16) which is integral with the other heating sub-assembly (2), the articulation element (16) being mobile between an articulation position in which the articulation element (16) penetrates into the housing (18) and a retracted position in which the articulation element (16) is outside the housing (18), and wherein the articulation element (16) is driven between the articulation position and the retracted position by the electricity supply component (8).

2. A household electrical appliance (1) comprising:
two heating sub-assemblies (2, 3) which are articulated on each other, each heating sub-assembly including a shell (5), a cooking plate (6), and an electric resistance (7);
an electricity supply component (8) comprising electrical components that contribute to the control of an electricity supply to the electric resistances (7) and contactors (9) adapted to establish an electrical connection between the electric resistances (7) and the electrical components irrespective of the position the two heating sub-assemblies (2, 3) are in;
wherein the electricity supply component (8) can be separated from the two heating sub-assemblies (2, 3), in the manner of an electric plug; and
wherein one of the heating sub-assemblies (2, 3) includes a manual control component (41) which is mobile between a rest position and an ejection position and which is adapted to engage with the electricity supply component (8) so as to drive the electricity supply component (8) out of a position in which the contactors (9) of the electricity supply component (8) are connected with the electric resistances (7).

3. A household electrical appliance (1) comprising:
two heating sub-assemblies (2, 3) which are articulated on each other by a hinge (4) and which each include a shell (5) forming the body of the sub-assembly (2, 3), a cooking plate (6) and an electric resistance (7); and
an electricity supply component (8) which includes contactors (9) adapted to establish the electrical connection with the electric resistances (7) and all the electrical components of the appliance (1) contributing to the controlled electricity supply of the electric resistances whatever position the two heating sub-assemblies (2, 3) are in, the electricity supply component (8) including two connection case (11, 12) connected to each other by a connecting cable (13), wherein the electricity supply component (8) can be separated from the two heating sub-assemblies (2, 3), and wherein each connection case (11, 12) can be separated from a corresponding shell (15) by a plugging into said shell (15) in the manner of an electric plug.

4. The household electrical appliance (1) according to claim 3, wherein, for each heating sub-assembly (2, 3), the electric resistance (7) is anchored to the cooking plate (6).

5. The household electrical appliance (1) according to claim 4, wherein, for each heating sub-assembly (2, 3), the cooking plate (6) is anchored to the shell (5).

6. The household electrical appliance (1) according to claim 3, wherein the electricity supply component (8) is adapted to engage with the hinge (4) by which the two healing sub-assemblies (2, 3) are articulated one relative to the other, such that, when the electricity supply component (8) is separated from the two heating sub-assemblies (2, 3), the hinge (4) is configured so as to allow the separation of the two heating sub-assemblies (2, 3), and, when the electricity supply component (8) is connected to the electric resistances (7) of the heating sub-assemblies (2, 3), the hinge (4) is configured so as to implement the articulation between the two heating sub-assemblies (2, 3).

7. The household electrical appliance (1) according to claim 6, wherein the hinge (4) includes at least one housing (18) which is implemented in a heating sub-assembly (3), and an articulation element (16) which is integral with the other heating sub-assembly (2), which is mobile between an articulation position in which it penetrates into the housing (18) and a retracted position in which it is outside the housing (18), and which is driven from one to the other of its positions by the electricity supply component (8).

8. The household electrical appliance (1) according to claim 7, wherein a return component (20) acts upon the articulation element (16) to bring it towards its retracted position.

9. The household electrical appliance (1) according to claim 7, wherein the articulation element (16) is carried by a rod (17) which is mounted to slide relative to the first heating sub-assembly (2) along the direction of the axis (19) of the hinge (4).

10. The household electrical appliance (1) according to claim 7, wherein the main case (11) is mounted to slide on the first heating sub-assembly (2) between a release position in which it can be separated from the first heating sub-assembly (2) and in which the articulation element (16) is in its retracted position, and a connection position which is the only position in which it supplies power to the corresponding electric resistance (7) and in which the articulation element (16) is in its articulation position.

11. The household electrical appliance (1) according to claim 10, wherein the main case (11) includes a guide surface (29) configured so as to drive a drive element (30) integral with the articulation element (16) during the displacement of the main case (11) between its release and connection positions.

12. The household electrical appliance (1) according to claim 10, wherein the main case (11) engages with the hinge (4) so that it is mobile from its release position, as far as its connection position if the two heating sub-assemblies (2, 3) are correctly arranged one relative to the other, or as far as a stop position located between its release and connection positions if the two heating sub-assemblies (2, 3) are not correctly arranged one relative to the other.

13. The household electrical appliance (1) according to claim 7, wherein the articulation element (16) is mobile from its retracted position, as far as a contact position in which it is stopped in the housing (18), if the two heating sub-assemblies (2, 3) are articulated one on the other, or, as far as a deployed position in which it projects beyond its contact position, if the two heating sub-assemblies (2, 3) are separated one from the other.

14. The household electrical appliance (1) according to claim 13, wherein the main case (11) is mounted to slide on the first heating sub-assembly (2) between a release position in which it can be separated from the first heating sub-assembly (2) and in which the articulation element (16) is in its retracted position, and a connection position which is the only position in which it supplies power to the corresponding electric resistance (7) and in which the articulation element (16) is in its articulation position, wherein the main case (11) engages with the hinge (4) so that it is mobile from its release position, as far as its connection position if the two heating sub-assemblies (2, 3) are correctly arranged one relative to the other, or as far as a stop position located between its release and connection positions if the two heating sub-assemblies (2, 3) are not correctly arranged one relative to the other, and wherein the main case (11) is mobile between its release position and a selection position located between its release and stop positions, and drives the articulation element (16) from its retracted position as far as its contact position when it moves from its release position to its selection position.

15. The household electrical appliance (1) according to claim 14, wherein the main case (11) includes a selection component (32) which is mobile between a drive position and an activated position, and which is adapted to engage with the articulation element (16) so that, when the articulation element (16) is in its contact position outside the housing (18), the selection component (32) is in its drive position and drives the articulation element (16) beyond its contact position when the main case (11) moves from its selection position to its stop position, and, when the articulation element (16) is in its contact position in the housing (18), the articulation element (16) drives the selection component (32) from its drive position to its activated position when the main case (11) moves from its selection position to its connection position.

16. The household electrical appliance (1) according to claim 15, wherein a return component (20) acts upon the articulation element (16) to bring it towards its retracted position, and wherein a spring (33) the force of which is greater than that of the spring (20) acting upon the articulation element (16), acts upon the selection component (32) to bring it to its drive position.

17. The household electrical appliance (1) according to claim 15, wherein the main case (11) includes a guide surface (29) configured so as to drive a drive element (30) integral with the articulation element (16) during the displacement of the main case (11) between its release and connection positions, and wherein the guide surface (29) includes a drive surface (34) which is adapted to drive the articulation element (16) from its retracted position to its contact position, a selection surface (35) which is carried by the selection component (32) and which extends the drive surface (34), a stop surface (36) which extends the selection surface (35) when the selection component (32) is in the drive position and which is configured so as to come to a stop against the drive element (30) when the main case (11) is in the stop position, and a connecting surface (37) which extends the selection surface (35) when the selection component (32) is in the activated position, which extends beyond the stop surface (36) and which is configured so as to keep the articulation element (16) in the housing (18), the drive element (30) being configured so as to be able to skirt round the stop surface (36) when it slides along the connecting surface (37).

18. The household electrical appliance (1) according to claim 3, wherein the electricity supply component (8) includes a gripping component (40) allowing it to be displaced manually.

19. The household electrical appliance (1) according to claim 3, wherein one of the heating sub-assemblies (2, 3) includes a manual control component (41) which is mobile between a rest position and an ejection position and which is adapted to engage with the electricity supply component (8) so as to drive the latter out of its position in which it is connected with the electric resistances (7).

20. The household electrical appliance (1) according to claim 19, wherein the manual control component (41) is a button (41) which is mounted to slide in the heating sub-assembly and which includes an inclined surface (43) adapted to slide against a complementary inclined surface (44) of the electricity supply component (8) in order to displace it.

21. The household electrical appliance (1) according to claim 19, wherein the manual control component (41) is a lever (41) which is mounted to pivot in the heating sub-assembly around a fulcrum pin (45) and which includes a cam surface (46) which is adapted to come to a stop against the electricity supply component (8) and to displace it when the lever (41) pivots.

\* \* \* \* \*